J. MARIS.
Wagon Wheel.

No. 71,774.

2 Sheets—Sheet 1.

Patented Dec. 3, 1867.

WITNESSES:
Henry T. Brown
Geo. F. Robinson

INVENTOR.
Jared Maris

J. MARIS.
Wagon Wheel.

2 Sheets—Sheet 2.

No. 71,774.

Patented Dec. 3, 1867.

WITNESSES:

INVENTOR.

United States Patent Office.

JARED MARIS, OF ATHENS, OHIO.

Letters Patent No. 71,774, dated December 3, 1867.

IMPROVEMENT IN WAGON-WHEELS.

The Schedule referred to in these Letters Patent and making part of the same.

TO ALL WHOM IT MAY CONCERN:

Be it known that I, JARED MARIS, of Athens, in the county of Athens, and State of Ohio, have invented a new and improved Wagon-Wheel, of which the following is a full and exact description, reference being had to the accompanying drawings, which are made part of these specificatons, in which—

Figure 1:
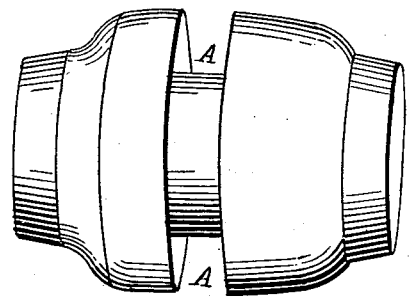
Figure 2:
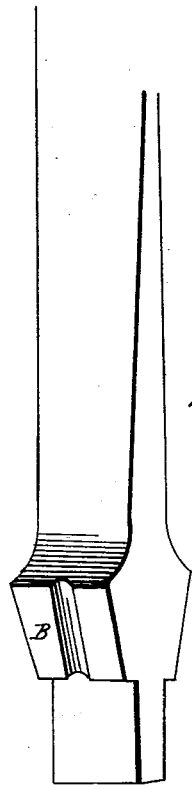
Figure 3:
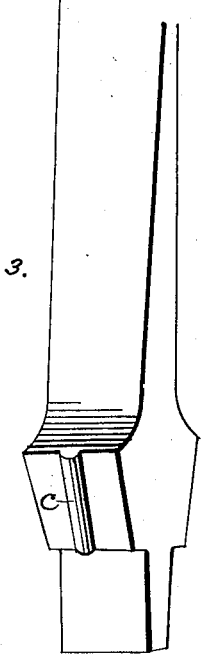
Figure 4:
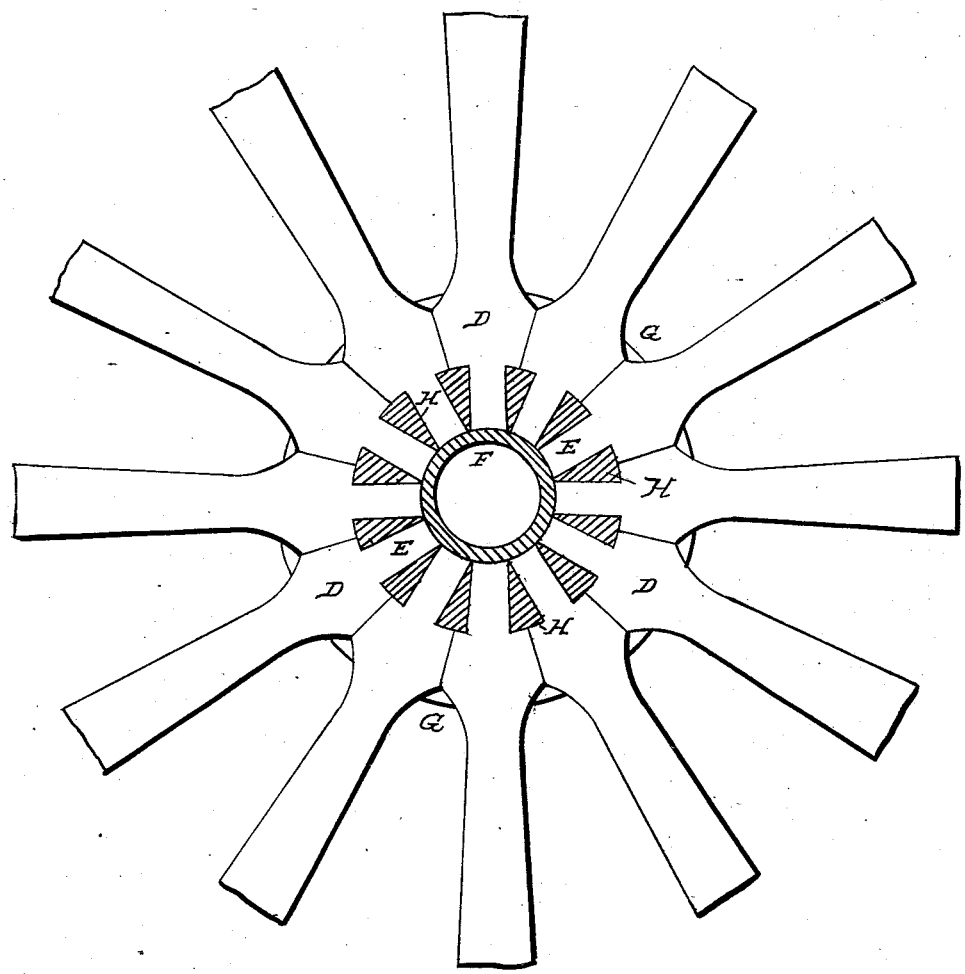

Figure 1 is a perspective view of the hub with groove.
Figure 2 is a perspective view of the spoke with groove.
Figure 3 is a perspective view of the spoke with tongue.
Figure 4 is a plain sectional view of the hub filled with spokes.

The separate parts of the invention are more particularly described, thus:

A, fig. 1, represents the groove in the hub into which the spokes are fitted. B, fig. 2, represents the groove in the spoke, and C, fig. 3, the tongue, matching and fitting together. D D, fig. 4, represent the spokes matched together in groove A, fig. 1. E E, fig. 4, represent the tenons of spokes inserted in mortises below the groove. F, fig. 4, represents the boxing of the hub. G G, fig. 4, represent the curved surface of the hub. H H, fig. 4, represent the portions of the hub between the mortises below the groove A.

What I claim as my invention, and desire to secure by Letters Patent, is—

1. The groove in the hub into which the spokes are fitted.
2. The manner of fitting the spokes together in a solid ring by tongue and groove.

JARED MARIS.

Witnesses:
   H. T. BROWN,
   GEO. F. ROBINSON.